United States Patent [19]

Goetz

[11] 4,322,385

[45] Mar. 30, 1982

[54] FILTERS FOR VEHICLE OCCUPANT RESTRAINT SYSTEM FLUID SUPPLIES

[75] Inventor: George W. Goetz, Detroit, Mich.

[73] Assignee: Eaton Corporation, Cleveland, Ohio

[21] Appl. No.: 237,333

[22] Filed: Feb. 23, 1981

Related U.S. Application Data

[63] Continuation of Ser. No. 43,297, May 29, 1979, abandoned, which is a continuation of Ser. No. 782,691, Mar. 30, 1977, abandoned, and Ser. No. 658,131, Feb. 13, 1976, abandoned.

[51] Int. Cl.³ .................. B01J 7/00; B60R 21/00; B01D 25/06
[52] U.S. Cl. .................. 422/165; 55/486; 55/487; 55/526; 55/527; 280/740; 102/530
[58] Field of Search ............. 422/120, 164, 165, 166, 422/167, 305, 125; 55/485, 486, 487, 520, 526, 527; 102/39; 280/740, 741

[56] References Cited

U.S. PATENT DOCUMENTS

| | | | |
|---|---|---|---|
| 1,395,833 | 11/1921 | Kling et al. | 55/486 |
| 1,807,521 | 5/1931 | Foulk | 55/486 |
| 2,586,935 | 2/1952 | Gerson | 55/486 X |
| 3,733,180 | 5/1973 | Heinecke et al. | 422/167 |
| 3,877,882 | 4/1975 | Lette et al. | 55/48.7 |
| 3,880,447 | 4/1975 | Thorn et al. | 280/740 |
| 3,898,048 | 8/1975 | Barber et al. | 102/39 X |
| 3,904,221 | 9/1975 | Shiku et al. | 280/741 |
| 4,012,211 | 3/1977 | Goetz | 422/164 |
| 4,017,100 | 4/1977 | Gehrig et al. | 422/305 |

Primary Examiner—Michael S. Marcus
Attorney, Agent, or Firm—C. H. Grace; R. A. Johnston

[57] ABSTRACT

A filter assembly is provided for fluid supplies for vehicle occupant restraint systems which employ a combustible gas generator to inflate a confinement upon the occurrence of a collision. The filter assembly includes two sets of layers of porous filter material.

One set includes a plurality of layers of fibrous filter material of relatively high porosity such as steel wool. The other set includes a plurality of layers of filter material arranged in order of descending porosity between the gas generator and the confinement and positioned intermediate the layers of the former set. Each of the layers of this other set is of substantially lower porosity than those adjacent layers of the former set.

16 Claims, 3 Drawing Figures

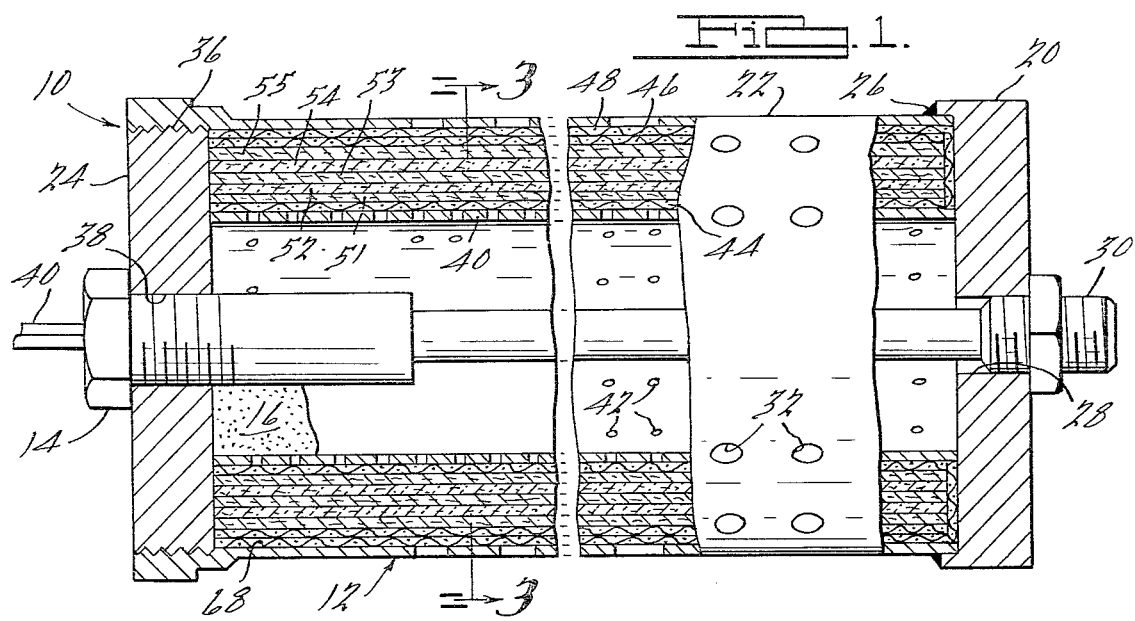
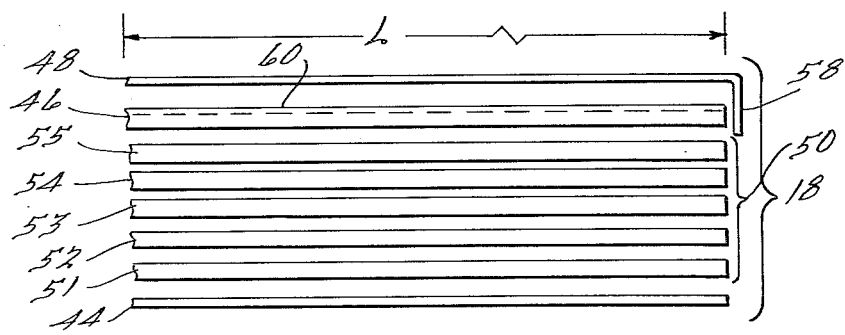
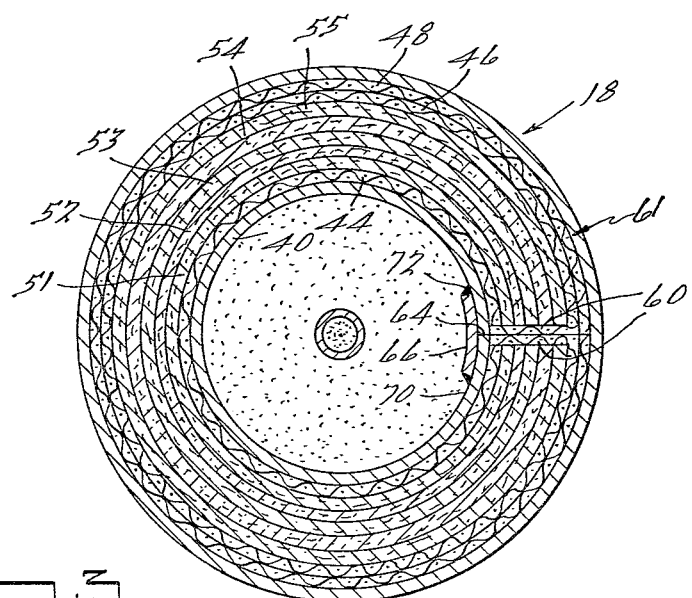

FILTERS FOR VEHICLE OCCUPANT RESTRAINT SYSTEM FLUID SUPPLIES

This is a continuation of application Ser. No. 043,297, filed May 29, 1979, which was a continuation of Ser. No. 782,691, filed Mar. 30, 1977 and Ser. No. 658,131, filed Feb. 13, 1976, all now abandoned.

BACKGROUND OF THE INVENTION

1. Field of the Invention

The present invention relates to filters for fluid supplies of vehicle occupant restraint systems employing combustible gas generators.

2. Description of the Prior Art

Multilayer filter assemblies for vehicle occupant restraint systems employing combustible gas generators are known in the prior art. Exemplary of this art are filters shown in a prior application Ser. No. 539,220, filed Jan. 8, 1975, now U.S. Pat. No. 4,017,100, of Applicant and R. G. Gehrig assigned to the assignee o the present invention and prior application Ser. No. 591,911 of Applicant, filed June 30, 1975, now U.S. Pat. No. 4,012,211, and assigned to the assignee of the present invention.

Certain disadvantages have been noted, however, in the use of such filter assemblies.

One of these is the tendency of solid contaminants to concentrate in certain areas of the filter and thereafter to burn through the filter layers. This tendency is commonly referred to as "pinholing."

Another disadvantage is the tendency of such filters to permit "channelling", that is, bypassing of one or more filter layers by a portion of the flowing gas due to inadequate support of one or more of the layers when intermediate support members are not used or are ineffective.

Still another disadvantage lies in the fact that the prior art filters tend to have high heat capacity, necessitating the use of large amounts of combustible material to effect inflation of the confinement.

SUMMARY OF THE INVENTION

It is an object of the present invention to provide an improved filter assembly for vehicle occupant restraint systems employing combustible gas generators which minimizes the concentration of contaminants passing through the filter.

It is another object to provide a filter which minimizes the tendency of combustion gases to bypass the filter.

It is yet another object to provide a filter whose heat capacity tends to permit the use of a minimum amount of combustion material for effecting inflation.

According to a feature of the invention layers of non-woven plenum material are interdigitated between layers of fibrous filter material of substantially lower porosity to support the filter material, evenly distribute contaminants, and permit high volume flow of gas per mass of combustible material.

BRIEF DESCRIPTION OF THE DRAWINGS

These objects and features, as well as others, will be apparent to those skilled in the art of filters for occupant restraint systems employing combustible gas generators upon reading the accompanying detailed description with reference to the drawings in which:

FIG. 1 is a fragmentary cross sectional view of a fluid supply incorporating the invention filter;

FIG. 2 is an exploded fragmentary cross sectional view of the filter assembly of the present invention; and FIG. 3 is a cross sectional view of the invention filter assembly taken along line 3—3 of FIG. 1.

DESCRIPTION OF THE PREFERRED EMBODIMENT

Referring now to FIG. 1, a fluid supply 10 is illustrated as including a cylindrical housing assembly 12, an igniter assembly 14, means 16 for generating gas for inflation through combustion, and a filter assembly 18 disposed between the gas generating means 16 and the housing 12. It should be understood, however, that the illustration of the filter assembly 18 as employed in the cylindrically housed fluid supply of the drawings is not intended to be limiting. The applicability of the invention filter to other fluid supplies (See, e.g., the flat pack fluid supply disclosed by applicant in application Ser. No. 539,220 and assigned to the assignee of the present invention.) will be apparent as the description continues.

The housing assembly 12 includes a base portion 20, a fluid directing portion 22, and an end cap 24. Base portion 20 is preferably secured to one end of the fluid directing portion 22 by welding or the like as illustrated at 26 and carries one end of the igniter assembly 14 in a centrally located bore 28 closed by a plug 30.

Fluid directing portion 22 defines a generally cylindrical shell through which a multiplicity of axially and circumferentially spaced ports 32 are formed.

The end of fluid directing portion 22 opposite the base portion 20 is illustrated as being internally threaded at 36 to receive the end cap 24 which is externally threaded.

The igniter assembly 14 is threadedly received in a centrally located internally threaded bore 38 in the end cap 24. The igniter assembly 14 may be of any known design but is illustrated in FIG. 1 as being of the type including electrical leads 40 for receiving a signal from a crash sensor (not shown) upon the occurrence of a collision.

The gas generating means 16 comprises suitable combustible material filling the space between the igniter assembly 14 and the filter assembly 18. While other combustible materials may be chosen, that having a granular solid form and composition as disclosed by applicant in his U.S. application Ser. No. 528,199 filed Nov. 29, 1974, now abandoned, and assigned to the assignee of the present invention is preferred. The particular arrangement of the gas generating material is preferably as set forth in the above referenced concurrent application of Applicant G. W. Goetz.

The filter assembly 18 is formed in a substantially cylindrical configuration as may best be seen in the FIGS. 1 and 3 and is illustrated as including a relatively thin perforated plate 40 having formed through it a plurality of axially and radially spaced holes 42, an inner support screen 44, first and second outer support screens 46 and 48, respectively, and a plurality of layers of deformable fibrous filter material 50.

The components of the filter assembly 18 are arranged generally in the order of their decreasing porosity in the flow direction as taught in the U.S. application Ser. No. 539,220 of Applicant and R. G. Gehrig, filed Jan. 1, 1975, and assigned to the assignee of the present invention. Inner support screen 44 is adjacent the perforated plate 40 and has a relatively high porosity and National Bureau of Standards mesh number, U.S. Standard testing sieve, market grade or equivalent such as No. 24. First outer support screen 46 is also highly porous with a National Bureau of Standards mesh number such as #24. Second outer support screen 48 is formed from a still more porous screen fabric such as No. 8 mesh.

The layers 50 of filter material are illustrated here as being arranged to effect filtration of the products of combustion of the gas generating means 16 while preventing clogging, channelling, or pin holing. Specifically, the layers 50 of deformable fibrous filter material, which are supported by the screens 44, 46 and 48, are arranged as two sets of layers. In the preferred embodiment one set comprises layers 52, 54 of high temperature washed fiberglas having fiber diameters in the range of two to ten microns such as is manufactured and sold under the trade name "Lo Con" by Carborundum Corp., P.O. Box 339, Niagra Falls, N.Y. 14302.

It will be clear to those skilled in the art, however, that other fibrous filter materials including those employing metallic fibers, could be used providing the layers are arranged to effect generally finer filtration in the downstream flow direction.

The other set comprises layers 51, 53, 55 of steel wool, preferably but not necessarily no. 0000 steel wool, which is substantially more porous than the washed fiberglas. Steel wool is most widely known in the art as being a fibrous, metallic material having a generally random fiber orientation. However, there is a type of steel wool formed by wrapping metal shavings around a mandrel to form a pad. This latter type of steel wool would have a certain degree of fiber orientation, although its structure would not be characterized as woven. As can best be seen in FIG. 2, the steel wool layers 51, 53, 55 are interdigitated with respect to the fiberglas layers 52, 54 with layer 51 being placed adjacent the inner support screen 44 and layer 55 being placed adjacent first outer support screen 46.

It is this arrangement of the layers that the present invention departs from the teaching of previously referenced application Ser. No. 539,220. The layer arrangement described presents a filter assembly of alternating porosity to the gas flowing from the gas generating means 16 outward through the fluid directing portion 22. The steel wool layers 51, 53, 55 serve as intermediate plenums, provide additional support for the adjacent filter layers, and redistribute contaminants. The redistribution tends to eliminate "pinholing". The additional support tends to prevent channelling; and the provision of intermediate plenum space tends to reduce the overall heat capacity of the filter through increased filter efficiency which is defined as (log particulates passed/heat capacity). This last effect in the preferred embodiment creates a warmer gas flow and consequently a greater volume flow per mass of propellant, allowing use of less propellant material for inflation. It should be clear, however, that improved filter efficiency might also be utilized to remove more solid products of combustion with a lower resulting gas temperature.

Many modifications of the array of filter layers are possible without departing from the spirit of invention. For example, more layers of filter and plenum material may be used, more than one plenum layer may be positioned adjacent the inner support screen 44 or different filter or plenum materials may be utilized. One specific substitution that has been successfully made is a layer of approximately 1.5 micron fiber high filtration paper such as is sold by Carborundum Corporation under the trade name HI-FI 660-FH PAPER.

FABRICATION AND INSTALLATION OF THE FILTER ASSEMBLY

To form the filter assembly 18 in the embodiment illustrated, the support screens 44, 46, and 48, and the layers 50 of deformable fibrous material are first fabricated substantially rectangular sheets of equal length denoted by reference letter -L- in FIG. 2 and having widths increasing proportionally with their distance from the central axis of the housing assembly 12, as viewed in FIG. 1.

The sheet forming second outer support screen 48 includes an inwardly extending flange portion 58 at one end to facilitate insertion into the housing assembly 12.

The sheet forming the first outer support screen 46 includes inwardly extending flange portions 60 on each longitudinal edge to effect closure of the filter assembly.

After fabrication the sheets are arranged in a flat pack shown in FIG. 2 and placed in a press wherein a high compressive force is applied.

Referring now to FIG. 3, the resulting compressed rectangular filter pack is subsequently formed by rolling or like process into a resilient cylinder having a transverse dimension, in its radially compressed condition, less than the inner diameter 68 of the housing assembly 12. The barrier effect of the flange portions 60 together with the maintaining of a uniform thickness in the fabrication of the filter back insures uniform distribution of the compressed filter material.

The perforated plate 40, which may be fabricated first as a rectangular sheet, is rolled or otherwise processed to form a cylinder (as may best be seen in FIG. 4) whose longitudinal seam 64 is closed by fixing a thin plate 66 to the inner diameter 70 of the perforated plate 40 at the seam 64 by weldments 72 or the like and whose inner diameter 70 is sized to receive the gas generating means 16.

To prepare the filter assembly 18 for installation in the typical radial flow generator housing 12 the perforated plate 40 is first placed within the resilient cylinder 61. The cylinder 61 is then radially loaded by means of a fixture (not shown) which is configured to allow sliding movement of the cylinder 61 with respect thereto. The longitudinal axis of cylinder 61 is then aligned with the longitudinal axis of the housing 12. An axial load is then applied to the filter assembly 18 to slide it out of the fixture into the housing 12, with inwardly extending flange portion 58 of second outer screen 48 providing a relatively smooth leading edge to facilitate insertion. In order to further aid insertion, the housing 12 may be vibrated to effectively reduce the frictional forces acting between the filter assembly 18 and the inner surface of housing 12.

When installed as described in FIG. 1 the filter assembly 18 effects filtration of the products of combustion of the gas generating means 16 which are released to flow outward through fluid directing passages 32 in the housing 12 when the gas generating means 16 is actuated by the igniter assembly 14 upon the occurrence of a collision. Gaseous products flow outward from the gas generating means 16 through holes 42 in the perforated plate 40, bypassing being prevented by the plate 66. Filtration of the solid products of the combustion is effected during passage through the screen 44, and the layers of filter material 50. Bypassing of these portions of the filter assembly 18 is prevented through the positioning of the seam 62.

Although the filter assembly of the present invention has been described in only certain embodiments, other embodiments and modifications may be constructed without departing from the spirit of the invention as presently claimed.

What is claimed is:

1. A filter for filtration of contaminants produced in the gas flow of a gas generator of the type used for inflation in vehicle occupant restraint systems, said filter comprising:
   (a) a plurality of layers comprising plenum zones for dispersing and filtering contaminants contained in said gas flow throughout said plenum zone, each of said layers being formed of a first filter material comprising a metallic wool material, each of said layers of first filter material defining a plenum zone; and
   (b) a plurality of layers of a second filter material, said second filter material being fibrous and having a porosity substantially less than said first filter material, wherein said plurality second filter material layers and said layers of plenum zones are disposed in alternating arrangement such that each layer of said second filter material is bounded on opposite sides thereof by a plenum zone layer;
   (c) first porous support means located adjacent the upstream side of said plurality of plenum zones; and
   (d) second porous support means located adjacent the downstream side of said plurality of plenum zones, said second support means permitting a gas flow therethrough, said first and second filter materials disposed between said first and second support means.

2. The filter as defined in claim 1, wherein,
   (a) said first material comprises fibers having diameters in the range of about 50 to about 150 microns; and
   (b) said second filter material comprises fibers having diameters in the range of about 1 to about 20 microns.

3. The filter as defined in claim 1 wherein said first filter material comprises steel wool and said second material comprises glass fibers.

4. The filter as defined in claim 1 wherein each layer of said first material is of substantially equal porosity.

5. The filter as defined in claim 1 wherein each layer of said second filter material is of substantially equal porosity.

6. The filter as defined in claim 1, wherein said plurality of layers of said second filter material are arranged to effect progressively finer filtration of contaminants in a downstream direction.

7. The filter as defined in claim 1 wherein said second filter material is a metallic material and said plurality of layers of said second filter material are arranged to effect progressively finer filtration of contaminants in a downstream direction.

8. The filter as defined in claim 1, wherein each of said second filter material layers is progressively less porous in the direction of flow.

9. A fluid generator for inflating an expandable confinement of a vehicle occupant restraint system, said fluid generator comprising:
   (a) housing means defining fluid discharge means for discharging fluid flow from said housing means;
   (b) fluid generating means disposed within said housing and including ignitable material which, upon ignition, burns to generate inflation gas and products of combustion for producing a flow of inflation gas;
   (c) filter means disposed within said housing means intermediate said fluid discharge means and said fluid generating means, said filter means including
      (i) a plurality of layers of a first filter material, said first filter material being formed of a metallic wool material, each of said layers of first filter material defining a plenum zone for dispersing and filtering contaminants contained in said fluid flow throughout said plenum zone,
      (ii) a plurality of layers of a second filter material, said second filter material being fibrous and having a porosity substantially less than said first filter material, said plurality of first and second filter material layers being disposed in alternating arrangement such that each layer of said second filter material is bounded on opposite sides thereof by one of said plenum zones, said second filter material chosen from the group consisting of non-woven metallic material or glass fibers;
   (d) first porous support means located adjacent the upstream side of said plurality of plenum zones; and
   (e) second porous support means located adjacent the downstream side of said plurality of plenum zones, said second support means permitting a gas flow therethrough, said first and second filter materials disposed between said first and second support means; and
   (f) means operable upon activation to ignite said ignitable material means.

10. The fluid generator defined in claim 9 wherein:
    (a) said first material comprises fibers having diameters in the range of about 50 to about 150 microns; and
    (b) said second filter material comprises fibers having diameters in the range of about 1 to about 20 microns.

11. The fluid generator as defined in claim 9 wherein said first filter comprises steel wool and said second filter material comprises glass fibers.

12. The fluid generator as defined in claim 9 wherein each layer of said first material is of substantially equal porosity.

13. The filter as defined in claim 9 wherein each layer of said second filter material is of substantially equal porosity.

14. The fluid generator as defined in claim 9 wherein said plurality of layers of said second filter material are arranged to effect progressively finer filtration of contaminants in a downstream direction.

15. A fluid generator as defined in claim 9, wherein said second filter material is metallic, said plurality of layers of said second filter material are arranged to effect progressively finer filtration of contaminants in a downstream direction.

16. The fluid generator as defined in claim 9, wherein each of said second filter material layers is progressively less porous in the direction of flow.

* * * * *